United States Patent [19]

Hums

[11] Patent Number: 4,851,381

[45] Date of Patent: Jul. 25, 1989

[54] CATALYST MATERIAL FOR REDUCING NITROGEN OXIDES IN FLUE GASES AND METHOD FOR PRODUCING THE SAME

[75] Inventor: Erich Hums, Erlangen, Fed. Rep. of Germany

[73] Assignee: Siemens Aktiengesellschaft, Berlin and Munich, Fed. Rep. of Germany

[21] Appl. No.: 106,565

[22] Filed: Oct. 8, 1987

[30] Foreign Application Priority Data

Oct. 8, 1986 [DE] Fed. Rep. of Germany ....... 3634335

[51] Int. Cl.$^4$ ........................ B01J 21/06; B01J 23/22; B01J 23/28; B01J 27/19

[52] U.S. Cl. .................................. 502/209; 502/220; 502/306; 502/309

[58] Field of Search ................ 502/209, 220, 306, 309

[56] References Cited

U.S. PATENT DOCUMENTS

| | | | |
|---|---|---|---|
| 3,799,888 | 3/1974 | Suvorov et al. | 502/309 |
| 4,085,193 | 4/1978 | Nakajaima et al. | 502/309 X |
| 4,207,209 | 6/1980 | Matsuda et al. | 502/309 X |
| 4,466,947 | 8/1984 | Imanari et al. | 502/309 X |

FOREIGN PATENT DOCUMENTS 2079172 1/1982 United Kingdom .

*Primary Examiner*—W. J. Shine
*Attorney, Agent, or Firm*—Herbert L. Lerner; Laurence A. Greenberg

[57] ABSTRACT

A catalyst material for nitrogen oxide reduction in flue gases in the presence of ammonia and a method for producing the same, includes adding vanadium oxide and at least one oxide of the elements from the group consisting of tungsten, phosphorous, sulfur, chromium, zirconium, magnesium, copper, cobalt, iron, and uranium to hydrothermal titanium oxide forming a mixture. The mixture is activated by grinding. A molybdenum component is admixed to the mixture. The mixture is subsequently temperature treated.

21 Claims, No Drawings

CATALYST MATERIAL FOR REDUCING NITROGEN OXIDES IN FLUE GASES AND METHOD FOR PRODUCING THE SAME

The invention relates to a catalyst material for nitrogen, nitric or nitrous oxide reduction in flue gases in the presence of ammonia, in which vanadium oxide as well as one or more oxides of the elements tungsten, phosphorus, sulfur, chromium, zirconium, magnesium, copper, cobalt, iron, or uranium are added to a hydrothermal titanium oxide that is known per se and this material is subjected to a process of activation by grinding.

German Published, Prosecuted Application No. DE-AS 24 58 888, corresponding to U.S. Pat. No. 4,085,193 describes a catalyst material for catalytically reducing nitrogen oxides in exhaust gases in the presence of ammonia to molecular nitrogen. Titanium oxide and vanadium oxide along with a number of other additives such as molybdenum, tungsten, nickel and cobalt are used as a catalytically effective combination. These substances that are catalytically effective in combination are obtained as hydroxides or water-soluble salts, exclusively by co-precipitation with titanic acid. They are subsequently dried and calcined. With this catalyst material, the nitrogen oxides in flue gases can be reduced in the presence of ammonia. However, the service life with this catalyst material under operational conditions still leaves something to be desired.

Another catalyst material for reducing the nitrogen oxides in flue gases has already been proposed in U.S. application Ser. No. 904,184, in which the calcined titanium oxide is used in the anastase form and is coated only on the surface with vanadium oxide and tungsten oxide. The catalytic activity can be shifted to lower flue gas temperatures with this catalyst material. However, it has been demonstrated that the anastase modification of the titanium oxide is not only dependent on temperature but is also dependent on various factors in the pre-treatment thereof.

U.S. application Ser. No. 021,443 discloses a way of developing a catalyst material that is sufficiently effective, that widens the temperature range of optimum catalytic activity toward lower temperatures and at the same time increases the surface life of the catalyst material. The starting material used in that case is hydrothermal titanium dioxide which is available commercially, which is virtually free of foreign ions, is also low in lattice defects and in which, probably for that reason, the phase conversion into the rutile modification is suppressed. Due to activation by grinding, the lattice defects required in this starting material for the catalytic activity are produced only at the surface of the crystals. As a result, it is no longer the phase conversion but rather abrasive wear that becomes a primary factor in the service life.

It is accordingly an object of the invention to provide a catalyst material for reducing nitrogen oxides in flue gases and a method for producing the same, which overcomes the hereinafore-mentioned disadvantages of the heretofore-known products of this general type and to lengthen the service life of the catalyst material even further in terms of abrasive wear.

With the foregoing and other objects in view there is provided, in accordance with the invention, a catalyst material for nitrogen oxide reduction in flue gases in the presence of ammonia, comprising a grinding-activated and temperature-treated mixture of hydrothermal titanium oxide, vanadium oxide, at least one oxide of the group of elements consisting of tungsten, phosphorus, sulfur, chromium, zirconium, magnesium, copper, cobalt, iron, and uranium, and a molybdenum component.

In accordance with another feature of the invention, there is provided molybdenum oxide added to the mixture.

In accordance with a further feature of the invention, there is provided ammonium molybdate added to the mixture and converted into molybdenum oxide.

In accordance with an added feature of the invention, the mixture is a slurried and slightly moist paste, and including a substrate onto which the mixture is applied.

In accordance with an additonal feature of the invention, the substrate is an expanded metal grating or wire mesh.

In accordance with yet another feature of the invention, the mixture is a slurried and slightly moist paste, and including a substrate onto which the mixture is rolled.

With the objects of the invention in view, there is also provided a method for producing a catalyst material for nitrogen oxide reduction in flue gases in the presence of ammonia, which comprises adding vanadium oxide and at least one oxide of the elements from the group consisting of tungsten, phosphorus, sulfur, chromium, zirconium, magnesium, copper, cobalt, iron, and uranium to hydrothermal titanium oxide forming a mixture, activating the mixture by grinding, admixing a molybdenum component to the mixture, and subsequently temperature treating the mixture.

Due to the admixture of a molybdenum component with the catalyst material and the ensuing temperature treatment of the mixture, the adhesion of the catalyst particles to one another after the temperature treatment is improved notably.

In accordance with another mode of the invention, there is provided a method which comprises admixing the molybdenum component following the grinding activation and prior to the temperature treatment. This improves the doping of the remaining catalyst components among one another.

In accordance with a further mode of the invention, there is provided a method which comprises admixing the molybdenum component prior to the activation by grinding. This makes the molybdenum content more uniform and makes it possible to attain optimal adhesion even with minimal additions of molybdenum.

In accordance with an added mode of the invention, there is provided a method which comprises admixing the molybdenum component following the temperature treatment performed after the grinding activation.

In accordance with an additional mode of the invention, there is provided a method which comprises admixing the molybdenum component following the temperature treatment in the form of calcination performed after the grinding activation.

In accordance with yet another mode of the invention, there is provided a method which comprises carrying out the admixture in a slurried, pasty state.

In accordance with yet a further mode of the invention, there is provided a method which comprises heating the mixture in connection with the temperature treatment to a maximum of 650° C. As a result of this thermal treatment, the admixed molybdenum compound is converted during the heating phase into molybdenum oxide, and the molybdenum oxide is then liquefied. A firm bond among the individual catalyst particles is then obtained upon cooling again and this is a precondition for improved service life.

In accordance with yet an additional mode of the invention, there is provided a method which comprises temporarily separating the temperature treatment into a protective drying and optional conversion phase lasting at least several minutes and a melting-on phase lasting seconds.

In accordance with still another mode of the invention, there is provided a method which comprises admixing molybdenum oxide to the mixture or admixing ammonium molybdate that converts into molybdenum oxide in the ensuing treatment, to the mixture.

In accordance with still an added mode of the invention, there is provided a method which comprises applying the slightly moist, pasty mixture to a substrate, such as an expanded metal grating or wire mesh.

In accordance with again another mode of the invention, there is provided a method which comprises rolling the mixture onto the substrate.

In accordance with a concomitant mode of the invention, there is provided a method which comprises extruding the pasty mixture to form granulate or honeycomb-like molded articles.

Other features which are considered as characteristic for the invention are set forth in the appended claims.

Although the invention is illustrated and described herein as embodied in a catalyst material for reducing nitrogen oxides in flue gases and a method for producing the same, it is nevertheless not intended to be limited to the details shown, since various modifications and structural changes may be made therein without departing from the spirit of the invention and within the scope and range of equivalents of the claims.

The construction and method of fabrication of the invention, however, together with additional objects and advantages thereof will be best understood from the following description of specific embodiments.

Referring now to the invention in detail, hydrothermal titanium dioxide ($TiO_2$) used as the starting material is ground with vanadium oxide ($V_2O_5$) and tungsten oxide $WO_3$ in a suspension having deionized water. It is also possible to add one or more oxides of the elements phosphorus, sulfur, chromium, zirconium, magnesium, copper, cobalt, iron and uranium, in addition to the vanadium oxide. In the simplest case, the energy input in the grinding can be attained by means of suitable dissolver mechanisms, unless special mills such as attrition mills are to be used. The product to be ground is first dried and then calcined. The titanium dioxide surface can also be coated incrementally with the particular ground oxides by repeated grinding and re-calcination. The material which is ground again following the last calcination, is mixed with ammonium molybdate in the preferred embodiment. Instead of ammonium molybdate, $MoO_3$ can also be used. A mill or grinding mechanism is no longer necessary for this mixing operation. Instead, this mixing can be carried out with the addition of deionized water in a more or less pasty state, using a kneader. The task of the kneader is simply to mix the added ammonium molybdate or molybdenum oxide sufficiently homogeneously with the catalyst material. The composition which is obtained can then be rolled out on expanded metal or a similar substrate. In the ensuing thermal treatment, the water content is first reduced. Then the ammonium molybdate decomposes and forms molybdenum oxide. As the temperature rises further, the molybdenum oxide melts. This last phase of the temperature treatment is limited to a few seconds. Upon cooling, the molybdenum oxide combines with the catalyst particles. The strength of adhesion of the individual components to one another is improved markedly due to this melting-on of the molybdenum oxide. It has been found that the service life of the finished catalyst is improved in this manner.

I claim:

1. Catalyst material for nitrogen oxide reduction in flue gases in the presence of ammonia, comprising a grinding-activated and temperature-treated mixture of hydrothermal titanium oxide, vanadium oxide, at least one oxide of the group of elements consisting of tungsten, phosphorus, sulfur, chromium, zirconium, magnesium, copper, cobalt, iron, and uranium, and a molybdenum component.

2. Catalyst material according to claim 1, including molybdenum oxide added to the mixture.

3. Catalyst material according to claim 1, including ammonium molybdate added to the mixture and converted into molybdenum oxide.

4. Catalyst material according to claim 1, wherein the mixture is a slurried and slightly moist paste, and including a substrate onto which the mixture is applied.

5. Catalyst material according to claim 4, wherein the substrate is an expanded metal grating or wire mesh.

6. Catalyst material according to claim 1, wherein the mixture is a slurried and slightly moist paste, and including a substrate onto which the mixture is rolled.

7. Method for producing a catalyst material for nitrogen oxide reduction in flue gases in the presence of ammonia, which comprises adding vanadium oxide and at least one oxide of the elements from the group consisting of tungsten, phosphorus, sulfur, chromium, zirconium, magnesium, copper, cobalt, iron, and uranium to hydrothermal titanium oxide forming a mixture, activating the mixture by grinding, admixing a molybdenum component to the mixture, and subsequently temperature treating the mixture.

8. Method for producing a catalyst material according to claim 7, which comprises admixing the molybdenum component following the grinding activation and prior to the temperature treatment.

9. Method for producing a catalyst material according to claim 7, which comprises admixing the molybdenum component prior to the activation by grinding.

10. Method for producing a catalyst material according to claim 7, which comprises admixing the molybdenum component following the temperature treatment performed after the grinding activation.

11. Method for producing a catalyst material according to claim 7, which comprises admixing the molybdenum component following the temperature treatment in the form of calcination performed after the grinding activation.

12. Method for producing a catalyst material according to claim 7, which comprises carrying out the admixture in a slurried, pasty state.

13. Method for producing a catalyst material according to claim 7, which comprises heating the mixture in connection with the temperature treatment to a maximum of 650° C.

14. Method for producing a catalyst material according to claim 7, which comprises separating the temperature treatment into a protective drying phase lasting at least several minutes and a melting-on phase lasting seconds.

15. Method for producing a catalyst material according to claim 7, which comprises separating the temperature treatment into a protective drying and conversion phase lasting at least several minutes and a melting-on phase lasting seconds.

16. Method for producing a catalyst material according to claim 7, which comprises admixing molybdenum oxide to the mixture.

17. Method for producing a catalyst material according to claim 7, which comprises admixing ammonium molybdate that converts into molybdenum oxide in the ensuing treatment, to the mixture.

18. Method for producing a catalyst material according to claim 12, which comprises applying the slightly moist, pasty mixture to a substrate.

19. Method for producing a catalyst material according to claim 12, which comprises applying the slightly moist, pasty mixture to a substrate in the form of an expanded metal grating or wire mesh.

20. Method for producing a catalyst material according to claim 18, which comprises rolling the mixture onto the substrate.

21. Method for producing a catalyst material according to claim 12, which comprises extruding the pasty mixture to form granulate or honeycomb-like molded articles.

* * * * *